(12) United States Patent
Ko et al.

(10) Patent No.: US 8,129,937 B2
(45) Date of Patent: Mar. 6, 2012

(54) DRIVING DEVICE AND ENERGY MANAGEMENT MODULE

(75) Inventors: Yu-Chun Ko, Taoyuan County (TW); Chiang-Wen Lai, Taoyuan County (TW); Chien-Chih Hsu, Taoyuan County (TW)

(73) Assignee: Nan Ya PCB Corp., Taoyuan County (TW)

( * ) Notice: Subject to any disclaimer, the term of this patent is extended or adjusted under 35 U.S.C. 154(b) by 1081 days.

(21) Appl. No.: 12/017,171

(22) Filed: Jan. 21, 2008

(65) Prior Publication Data
US 2009/0108799 A1   Apr. 30, 2009

(30) Foreign Application Priority Data
Oct. 26, 2007   (TW) ................................ 96140219 A

(51) Int. Cl.
*H02J 7/00* (2006.01)
(52) U.S. Cl. ............................. 320/101; 429/12; 307/66
(58) Field of Classification Search .................. 320/101; 307/66; 429/12
See application file for complete search history.

(56) References Cited

U.S. PATENT DOCUMENTS

| | | | | |
|---|---|---|---|---|
| 4,670,702 | A | * | 6/1987 | Yamada et al. ............... 320/101 |
| 5,087,871 | A | * | 2/1992 | Losel ............................ 323/299 |
| 2004/0033395 | A1 | | 2/2004 | Thompson |
| 2004/0185317 | A1 | | 9/2004 | Aoyagi et al. |
| 2007/0092763 | A1 | | 4/2007 | Ouchi |

FOREIGN PATENT DOCUMENTS

| | | |
|---|---|---|
| CN | 1726609 A | 1/2006 |
| DE | 10127892 B4 | 10/2003 |
| DE | 10226339 A1 | 12/2003 |
| JP | 7-272736 | 10/1995 |
| JP | 2003-197230 | 7/2003 |
| JP | 2006-302886 | 11/2006 |
| JP | 2007-026933 | 2/2007 |

OTHER PUBLICATIONS

"LTC4065/LTC4065A Standalone 750mA Li-Ion Battery Charger in 2×2 DFN", Linear Technology, 2005.

* cited by examiner

*Primary Examiner* — Samuel Berhanu

(57) ABSTRACT

A driving device for driving a load and including a secondary cell, a fuel cell, and an energy management module. The energy management module is coupled to the secondary cell and the fuel cell and generates a first current or a second current to the load according to the voltage of the fuel cell.

14 Claims, 5 Drawing Sheets

DRIVING DEVICE AND ENERGY MANAGEMENT MODULE

BACKGROUND OF THE INVENTION

1. Field of the Invention

The invention relates to a driving device, and more particularly to a driving device comprising a fuel cell.

2. Description of the Related Art

Fuel cells are widely used in domestic backup power systems, transportable power systems, or portable electronic devices. Each fuel cell comprises a Membrane Electrode Assembly (MEA). When a fuel comprising a fixed concentration is provided to the anode of the MEA and appropriate oxygen is provided to the cathode of the MEA, a potential difference between the anode and the cathode is generated due to a chemical reaction. Thus, allowing the fuel cell to provide current to an external load. Since product of the fuel cell comprises carbon dioxide and water, organic matter is not generated. Thus, fuel cells are not environmentally friendly.

The chemical reaction of fuel cells changes given different factors, such as concentration, temperature of the fuel cell, or environment temperature. Thus, fuel cells cannot provide stable current to an external load. When performance of fuel cells is poor, if the fuel cells can still provide a large current to the external load, the fuel cells may become damaged. If the fuel cells provide a small current to the external load, the performance of the fuel cells will not be adequate. Additionally, if the fuel cells are not utilized for a long period of time, the fuel cells must be activated, when the fuel cells are utilized.

BRIEF SUMMARY OF THE INVENTION

Driving devices are provided. An exemplary embodiment of a driving device, which drives a load, comprises a secondary cell, a fuel cell, and an energy management module. The energy management module is coupled to the secondary cell and the fuel cell and generates a first current or a second current to the load according to the voltage of the fuel cell.

Energy management modules are also provided. An exemplary embodiment of an energy management module, which is coupled to a secondary cell and a fuel cell for driving a load, comprises a voltage transformation unit and a current generation unit. The voltage transformation unit transforms the voltage of the secondary cell or the voltage of the fuel cell to generate a voltage signal. The current generation unit receives the voltage signal and generates a first current or a second current according to voltage of the fuel cell.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
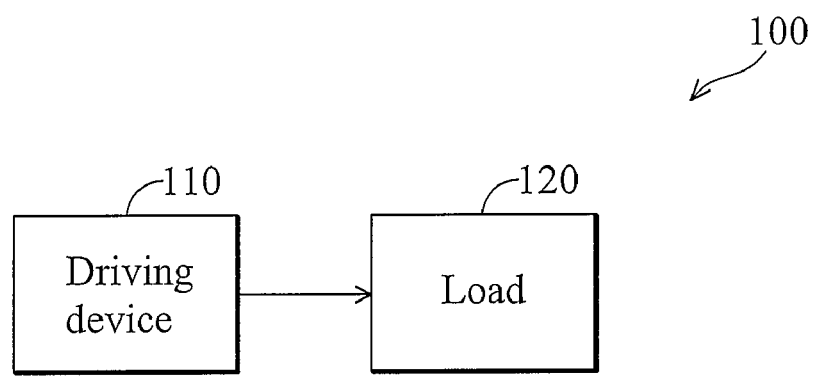
FIG. 1 is a schematic diagram of an exemplary embodiment of a driving system.

FIG. 1 is a schematic diagram of an exemplary embodiment of a driving system. The driving system 100 comprises a driving device 110 and a load 120. The load 120 receives a power signal provided by the driving device 110 to execute the related functions. In this embodiment, the load 120 is a fan, a pump, a heater, or other electric equipment.

Figure 2:
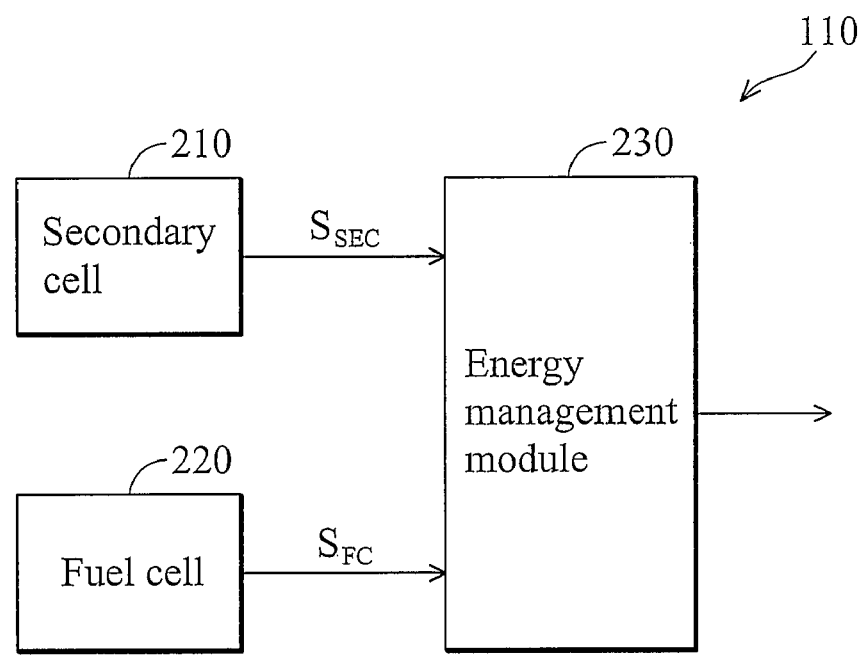
FIG. 2 is a schematic diagram of an exemplary embodiment of a driving device.

FIG. 2 is a schematic diagram of an exemplary embodiment of a driving device. The driving device 110 comprises a secondary cell 210, a fuel cell 220, and an energy management module 230. The secondary cell 210 is a rechargeable cell, for example, lithium ion secondary battery, nickel-cadmium cell, or nickel-metal-hydride battery. The energy management module 230 is coupled to the secondary cell 210 and the fuel cell 220 for driving the load 120 according to the voltage $S_{SEC}$ generated by the secondary cell 210 or according to the voltage $S_{FC}$ generated by the fuel cell 220.

In this embodiment, when the fuel cell 220 is unstable, the energy management module 230 drives the load 120 according to voltage $S_{SEC}$ generated by the secondary cell 210. When the fuel cell 220 is stable, the energy management module 230 provides current to the load 120 according to the voltage $S_{FC}$ generated by the fuel cell 220. In one embodiment, when the voltage $S_{FC}$ generated by the fuel cell 220 is less than a preset value, the energy management module 230 provides a first current to the load 120. When the voltage $S_{FC}$ generated by the fuel cell 220 exceeds the preset value, the energy management module 230 provides a second current to the load 120. The second current exceeds the first current.

Figure 3:
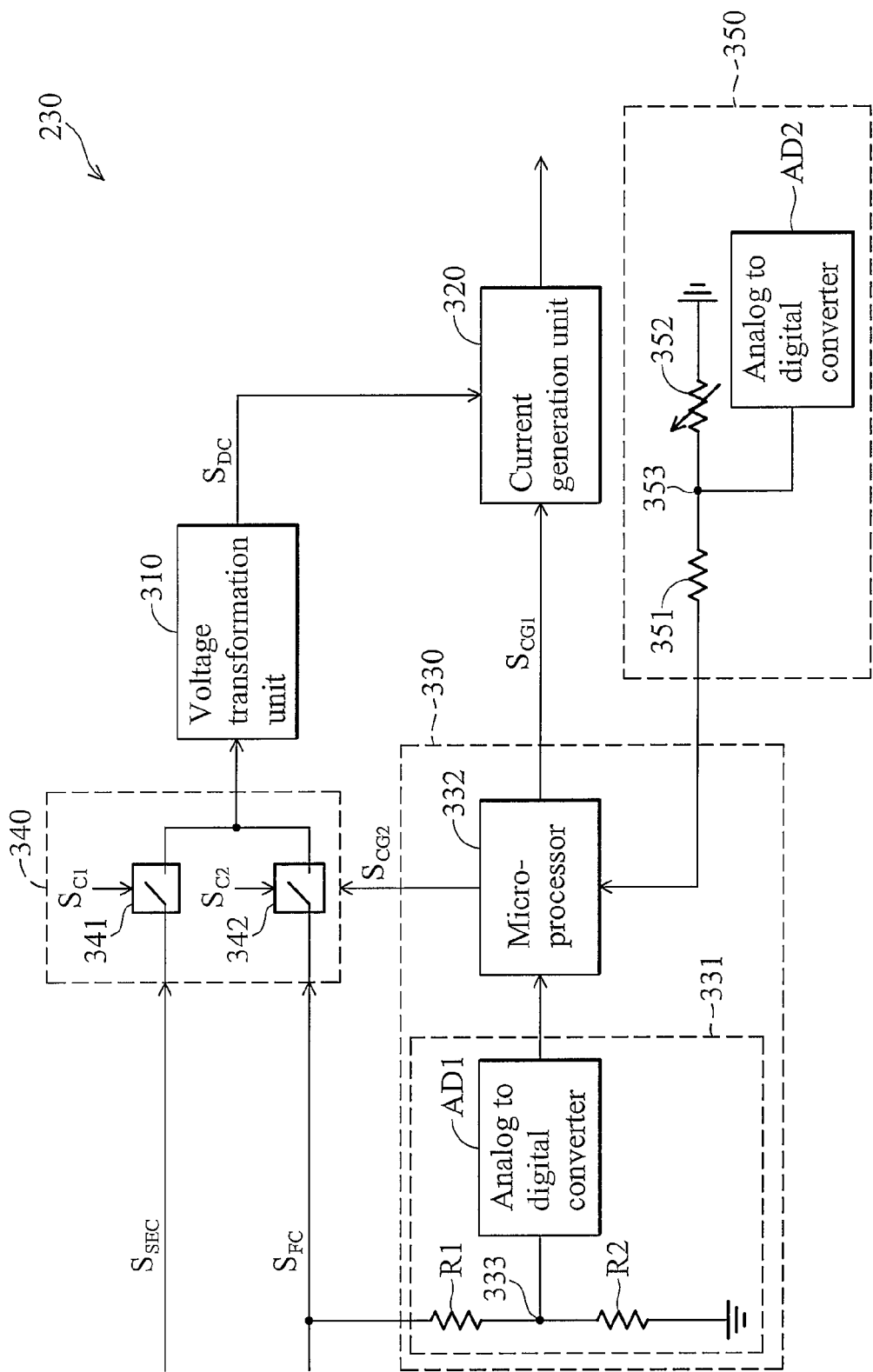
FIG. 3 is a schematic diagram of an exemplary embodiment of an energy management module.

FIG. 3 is a schematic diagram of an exemplary embodiment of the energy management module. The energy management module 230 comprises a voltage transformation unit 310 and a current generation unit 320. The voltage transformation unit 310 transforms the voltage $S_{SEC}$ or $S_{FC}$ to generate a voltage signal $S_{DC}$. In this embodiment, the voltage transformation unit 310 is a DC to DC converter. The current generation unit 320 receives the voltage signal $S_{DC}$ and generates the different currents to the load according to a signal group $S_{CG1}$.

In this embodiment, the energy management module 230 further comprises a process unit 330. The process unit 330 provides the signal group $S_{CG1}$ to the current generation unit 320 according to the state (the voltage $S_{FC}$ or temperature) of the fuel cell. Thus, the current generation unit 320 can provide different currents to the load according to the state of the fuel cell. Additionally, the process unit 330 further provides a signal group $S_{CG2}$ to a switch unit 340 according to the state of the fuel cell. Thus, the switch unit 340 transmits the voltage $S_{SEC}$ or $S_{FC}$ to the voltage transformation unit 310 according to the state of the fuel cell.

Referring to FIG. 3, the switch unit 340 comprises switches 341 and 342. Switch 341 is controlled by a control signal $S_{C1}$ of the signal group $S_{CG2}$. Switch 342 is controlled by a control signal $S_{C2}$ of the signal group $S_{CG2}$. When the switch 342 is turned off, the voltage $S_{FC}$ detected by the process unit 330 is an open loop voltage. When the switch 342 is turned on, the voltage $S_{FC}$ detected by the process unit 330 is a close loop voltage. In this embodiment, the process unit 330 generates the signal groups $S_{CG1}$ and $S_{CG2}$ according to the open loop or the close loop voltage.

For example, when the open loop voltage of the fuel cell is less than an operation voltage, the switch unit 340 outputs the voltage $S_{SEC}$ to the voltage transformation unit 310. Thus, the current generation unit 320 drives the load according to the voltage $S_{SEC}$. In other embodiment, the switch 342 can be momentarily (30 sec) turned on such that the open loop voltage can quickly arrive to the operation voltage. At this time, if the fuel cell is utilized to charge the secondary cell or to provide a small current to the load, the fuel cell can be activated.

When the open loop voltage of the fuel cell exceeds the operation voltage, the switch unit 340 outputs the voltage $S_{FC}$ to the voltage transformation unit 310. At this time, the process unit 330 generates the signal group $S_{CG1}$ to the current generation unit 320 according to the close loop voltage of the fuel cell. Thus, the current generation unit 320 receives the transformation result generated by the voltage transformation unit 310 and provides current to drive the load according to the signal group $S_{CG1}$.

For example, when the close loop voltage of the fuel cell is less than a preset value, the energy management module 230 provides a smaller current. When the close loop voltage of the fuel cell exceeds the preset value, the energy management module 230 provides a larger current. In this embodiment, the process unit 330 comprises a detection circuit 331 and a micro-processor 332. The detection circuit 331 detects the voltage $S_{FC}$ of the fuel cell. The micro-processor 332 generates the signal groups $S_{CG1}$ and $S_{CG2}$ according to the detection result.

The detection circuit 331 comprises resistors R1, R2, and an analog to digital converter (ADC) AD1. The analog to digital converter AD1 transforms the voltage of the node 333 and provides the transformation result to the micro-processor 332. Since the voltage of the node 333 is changed according to the voltage $S_{FC}$ of the fuel cell, the micro-processor 332 obtains the state of the fuel cell according to the transformation result generated by the analog to digital converter AD1.

In some embodiments, the energy management module 230 further comprises a temperature detection unit 350 for detecting the temperature of the fuel cell or the environment temperature of the fuel cell. The temperature detection unit 350 comprises resistors 351, 352, and an analog to digital converter AD2. The resistor 352 is a thermal resistor or other thermometry elements. The analog to digital converter AD2 transforms the voltage of the node 353 and transmits the transformation result to the micro-processor 332. Since the voltage of the node 353 is changed according to the temperature, such as the temperature of the fuel cell or the environment temperature of the fuel cell, the micro-processor 332 generates the signal groups $S_{CG1}$ and $S_{CG2}$ according to the detection result generated by the temperature detection unit 350.

For example, if the temperature of the fuel cell is too low, the switch unit 340 outputs the voltage $S_{SEC}$ of the secondary cell to the voltage transformation unit 310 according to the signal group $S_{CG2}$ generated by the process unit 330. Thus, the temperature of the fuel cell is increased according to an activated procedure when the temperature of the fuel cell is too low. In one embodiment, when the temperature of the fuel cell is less than a preset temperature, the fuel cell charges the secondary cell or the fuel cell provides a small current to the load such that the temperature of the fuel cell is increased.

Figure 4:
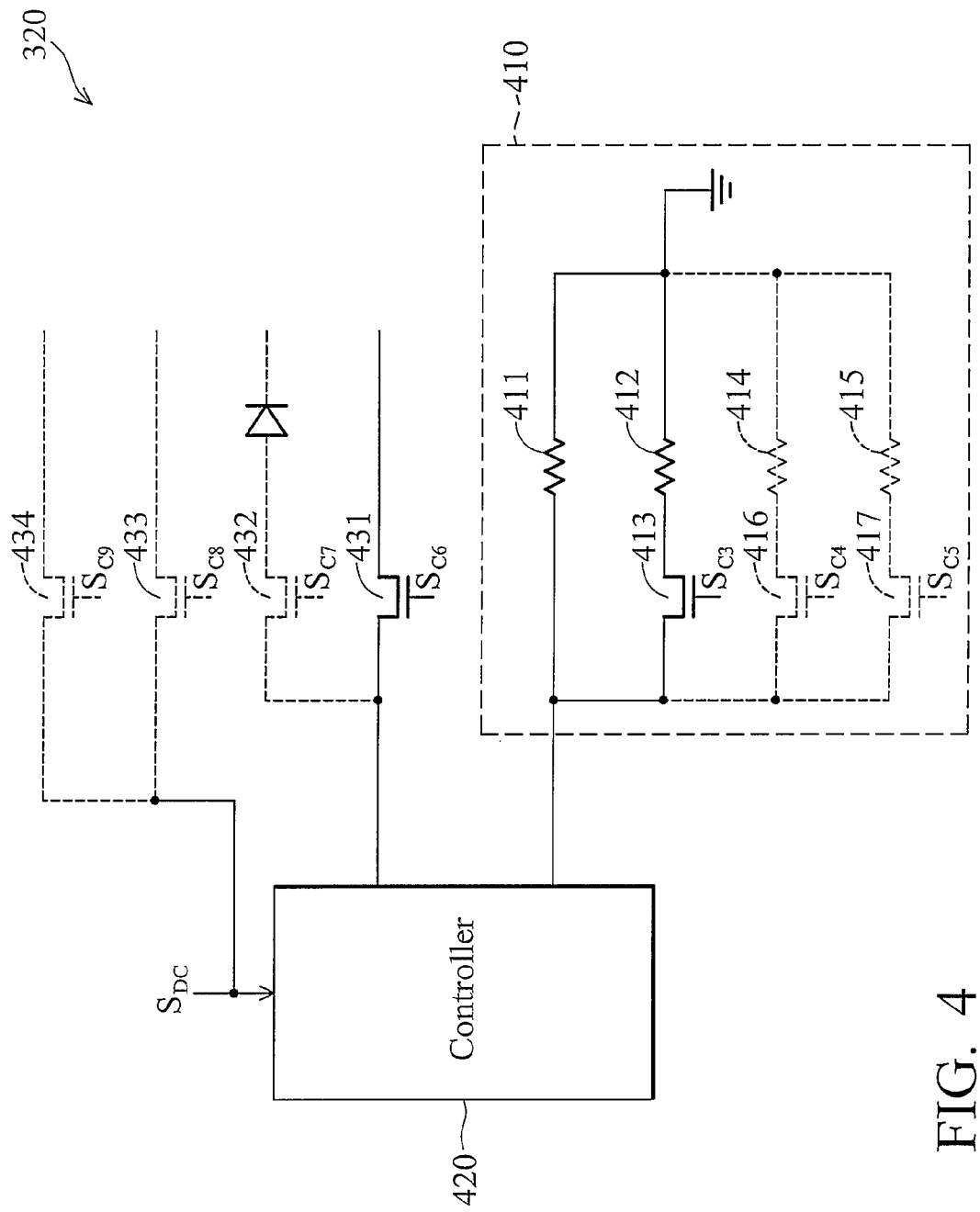
FIG. 4 is a schematic diagram of an exemplary embodiment of a current generation unit.

FIG. 4 is a schematic diagram of an exemplary embodiment of the current generation unit. The current generation unit 320 comprises a current limit unit 410 and a controller 420. The current limit unit 410 provides the different impedance values according to the voltage $S_{FC}$ of the fuel cell. The controller 420 generates the corresponding current to the load according to the impedance value provided by the current limit unit 410. In this embodiment, the controller 420 can be the LTC4065 manufactured by Linear or the MAX1870A or MAZ8724 manufactured by Maxim, but the disclosure is not limited thereto.

Additionally, the current limit unit 410 comprises resistors 411, 412, and a switch 413 for providing a first impedance value or a second impedance value to the controller 420. The switch 413 is controlled by a control signal $S_{C3}$ of the signal group $S_{CG1}$. When the switch 413 is turned on, the controller 420 receives an impedance value. When the switch 413 is turned off, the controller 420 receives another impedance value. In some embodiments, the current limit unit 410 further comprises resistors 414, 415, switches 416 and 417. The switch 416 is controlled by a control signal $S_{C4}$ of the signal group $S_{CG1}$. The switch 417 is controlled by a control signal $S_{C5}$ of the signal group $S_{CG1}$. When the switches 413, 416, and 417 are turned on or off, the controller 420 can receive the different impedance values.

The controller 420 generates the corresponding current according to the impedance value provided by the current limit unit 410. For example, when the voltage (close loop voltage) of the fuel cell is less than a preset value, the process unit 330 turns off the switch 413 according to the control signal $S_{C3}$ of the signal group $S_{CG1}$. Thus, the controller 420 generates a first current according to the impedance value of the resistor 411. When the voltage (close loop voltage) of the fuel cell exceeds the preset value, the process unit 330 turns on the switch 413. Thus, the controller 420 generates a second current according to impedance value. The first current exceeds the second current.

Additionally, in this embodiment, the current provided by the controller 420 is transmitted to the load via the switch 431. The switch 431 is controlled by the control signal $S_{C6}$ of the signal group $S_{CG1}$. Thus, the process Unit 330 determines whether to capture current from the fuel cell to the load according to the state of the fuel cell.

Since the load may comprise a fan and a pump, the switches 433 and 434 are respectively coupled to the fan and the pump in other embodiments. When the open loop voltage of the fuel cell is less than an operation voltage, the process unit 330 momentarily turns on the switch 433 or 434 according to the control signals $S_{C8}$ and $S_{C9}$ of the signal group $S_{CG1}$. Thus, the open loop voltage of the fuel cell can quickly arrive to the operation voltage.

Additionally, when the open loop voltage of the fuel cell arrives to the operation voltage and the temperature of the secondary cell is less than a preset temperature, the control signal $S_{C7}$ of the signal group $S_{CG1}$ is utilized to turn on the switch 432. Thus, the secondary cell is charged such that the temperature of the secondary cell is increased.

Figure 5:
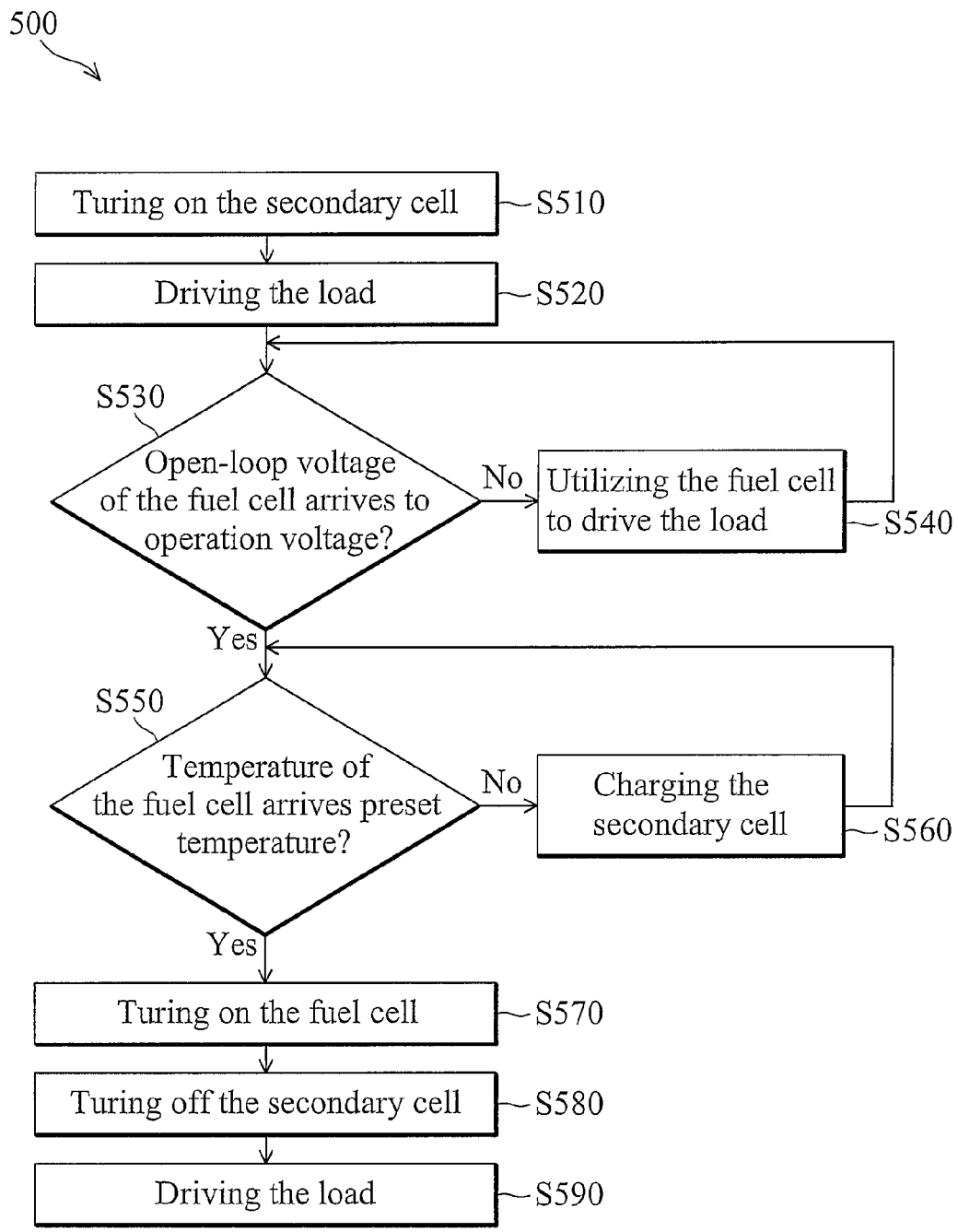
FIG. 5 is a schematic diagram of an exemplary embodiment of a control method.

FIG. 5 is a schematic diagram of an exemplary embodiment of a control method. The control method 500 utilizes a secondary cell or a fuel cell to drive a load. When the fuel cell is unstable, the secondary cell is utilized to drive the load. When the fuel cell is stable, the fuel cell is utilized to drive the load. Additionally, the control method 500 is utilized to quickly stable the fuel cell. First, the secondary cell is turned on (step S510). Then, the secondary cell is utilized to drive the load (step S520). Since the fuel cell is not utilized for a long time, the fuel cell cannot generate a stable voltage to the load. Thus, the secondary cell is utilized to drive the load at the start.

Then, the open loop voltage of the fuel cell determines whether to arrive at an operation voltage (step S530). When the open loop voltage of the fuel cell is less than the operation voltage, the fuel cell is utilized to drive a portion of the load (step S540) and then the step 530 is executed again.

For example, if the load comprises a fan and a pump, because the fan requires a small driving current (such as 20 mA), the fuel cell first drives the fan for increasing the open loop voltage of the fuel cell. After the fuel cell drives the load for a period of time (such as 30 sec), the open loop voltage of the fuel cell is determined again (step S530).

If the open loop voltage of the fuel cell arrives to the operation voltage, the temperature of the fuel cell is detected (step S550). If the temperature of the fuel cell is less than a preset temperature, the fuel cell is utilized to charge the secondary cell (step S560) for increasing the temperature of the fuel cell. After the secondary cell is charged for a period of time, the temperature of the fuel cell is detected again.

If the temperature of the fuel cell arrives at a preset temperature, the fuel cell is stabilized. Thus, the fuel cell is turned on (step S570) and the secondary cell stops driving the load (step S580). Since the fuel cell is stable, the fuel cell is utilized to drive the load (step S590).

Figure 6:
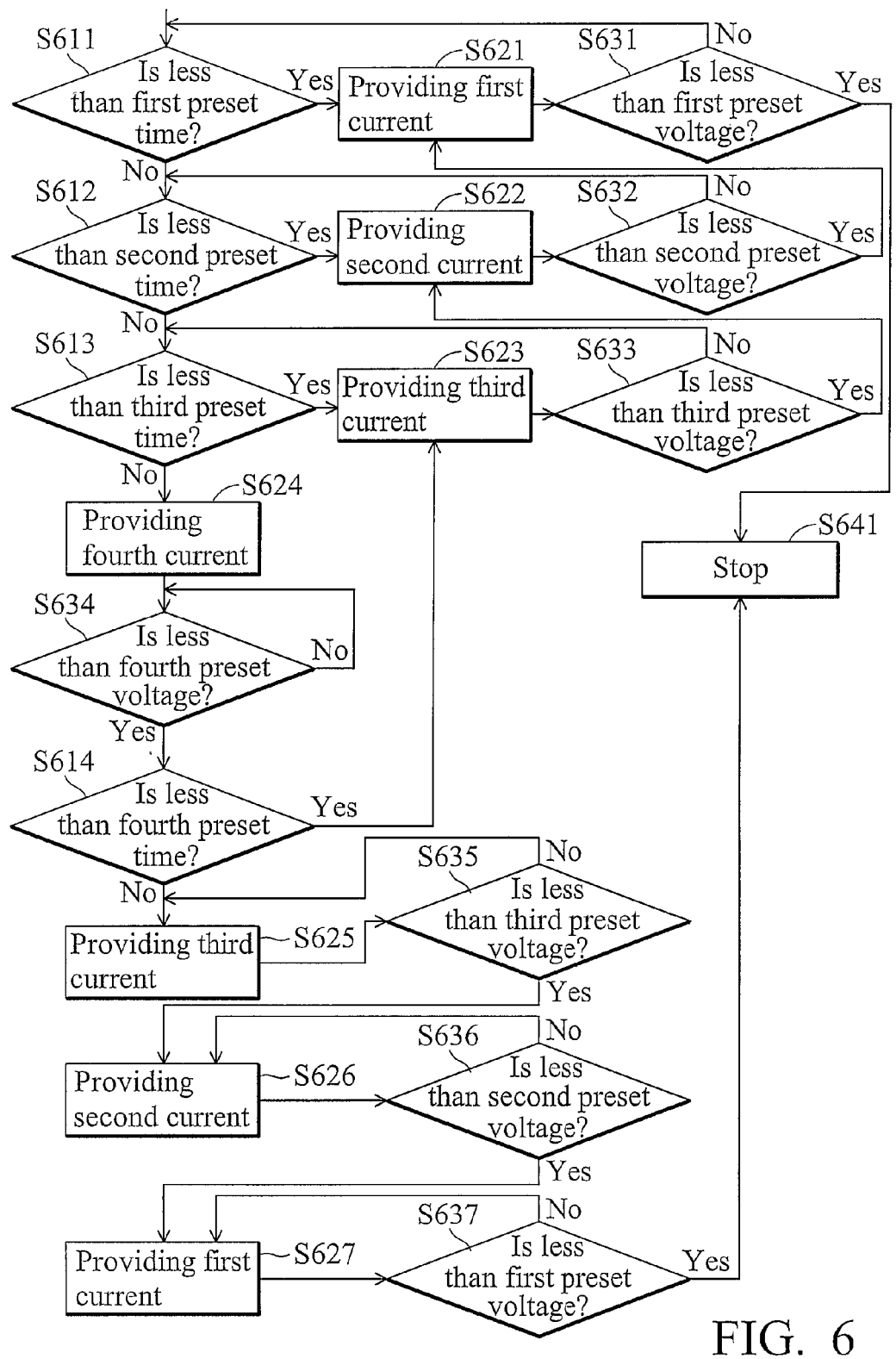
FIG. 6 is a schematic diagram of an exemplary embodiment of generating the driving current.

FIG. 6 is a schematic diagram of an exemplary embodiment of generating the driving current. When the open loop voltage of the fuel cell arrives to the operation voltage, the fuel cell provides the corresponding current to the load according to the voltage of the fuel cell. Thus, the fuel cell is not excessively utilized such that the life of the fuel cell is increased.

The time of driving the load is determined by a first preset time (step S611). If the time of driving the load arrives to the first preset time, a first current is provided (step S621). Then, the step 631 is executed for determining whether the voltage of the fuel cell is less than a first preset voltage. If the voltage of the fuel cell is less than the first preset voltage, the fuel cell cannot drive the load normally. Thus, the fuel cell stops driving the load (step S641). If the voltage of the fuel cell is not less than the first preset voltage, the step 611 is executed.

When time of driving the load arrives to the first preset time, it is determined whether the time of driving the load should arrive to a second preset time (step S612). If time of driving the load arrives to the second preset time, a second current is provided (step S622). Then, the step 632 is executed for determining whether the voltage of the fuel cell is less than a second preset voltage. If the voltage of the fuel cell is less than the second preset voltage, the step 621 is executed. If the voltage of the fuel cell is not less than the second preset voltage, the step 612 is executed. In this embodiment, the second preset time exceeds the first preset time, the second current exceeds the first current, and the second preset voltage exceeds the first preset voltage.

When time of driving the load arrives to the second preset time, it is determined whether the time of driving the load should arrive to a third preset time (step S613). If time of driving the load arrives to the third preset time, a third current is provided (step S623). Then, the step 633 is executed for determining whether the voltage of the fuel cell is less than a third preset voltage. If the voltage of the fuel cell is less than the third preset voltage, the step 622 is executed. If the voltage of the fuel cell is not less than the third preset voltage, the step 613 is executed. In this embodiment, the third preset time exceeds the second preset time, the third current exceeds the second current, and the third preset voltage exceeds the second preset voltage.

When time of driving the load arrives to the third preset time, a fourth current is provided (step S624). In this embodiment, the fourth current exceeds the third current. Then, the step 634 is executed for determining whether the voltage of the fuel cell is less than a fourth preset voltage. If the voltage of the fuel cell is not less than the fourth preset voltage, the step 634 is executed again.

If the voltage of the fuel cell is less than the fourth preset voltage, the step S614 is executed for determining whether the time of driving the load is less than a fourth preset time. If the time of driving the load is less than the fourth preset time, the step 623 is executed. If the time of driving the load is not less than to the fourth preset time, the third current is provided (step S625).

Then, the step S635 is executed for determining whether the voltage of the fuel cell is less than the third preset voltage. If the voltage of the fuel cell is not less than the third preset voltage, the step S625 is executed. If the voltage of the fuel cell is less than the third preset voltage, the second current is provided (step S626). Next, the step S636 is executed for determining whether the voltage of the fuel cell is less than the second preset voltage. If the voltage of the fuel cell is not less than the second preset voltage, the step S626 is executed. If the voltage of the fuel cell is less than the second preset voltage, the first current is provided (step S627). Then, the step S637 is executed for determining whether the voltage of the fuel cell is less than the first preset voltage. If the voltage of the fuel cell is not less than the first preset voltage, the step S627 is executed. If the voltage of the fuel cell is less than the first preset voltage, the step S641 is executed.

The current of driving the load is changed according to the time of driving the load and the voltage of the fuel cell. When the time of driving the load is longer, if the voltage of the fuel cell is not less than a preset voltage, the current of driving the load is increased. If the voltage of the fuel cell is reduced, the fuel cell may become unstable. Thus, the current of driving the load is gradually reduced according to the voltage of the fuel cell for reducing the loading of the fuel cell. When the voltage of the fuel cell is too small, the fuel cell stops driving the load and the secondary cell is utilized to drive the load such that the load can normally operate.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving device for driving a load, comprising:
    a second cell;
    a fuel cell; and
    an energy management module coupled to the secondary cell and the fuel cell and generating a first current or a second current to the load according to a voltage of the fuel cell, wherein when the voltage generated by the fuel cell is less than a preset value, the energy management module provides the first current to the load, and when the voltage generated by the fuel cell exceeds the preset value, the energy management module provides the second current to the load, wherein the second current exceeds the first current;
    wherein the energy management module comprises:
        a voltage transformation unit transforming the voltage of the secondary cell or the voltage of the fuel cell to generate a voltage signal a current generation unit receiving the voltage signal and generating the first current or the second current according to the voltage of the fuel cell;

the current generation unit comprising:— a current limit unit providing a first impedance value or second impedance value according to the voltage of the fuel cell;

the current limit unit comprises:

a first resistor;

a second resistor;

a first switch connected in series with the second resistor, when the first switch is turned off the first resistor is disconnected from the second resistor and the current limit provides the first impedance value;

when the first switch is turned on the first resistor is connected in parallel with the second resistor and the current limit provides the second impedance value; and a controller generating the first current when the current limit unit provides the first impedance value and generating the second current when the current limit provides the second impedance value.

2. The driving device as claimed in claim 1, wherein the first switch is turned off when the voltage of the fuel cell is less than the preset value and the first switch is turned on when the voltage of the fuel cell exceeds the preset value.

3. The driving device as claimed in claim 1, wherein the energy management module further comprises a process unit detecting the state of the fuel cell and controlling the current generation unit to generate the first or the second current according to the detection result.

4. The driving device as claimed in claim 3, wherein the process unit comprises:

a detection circuit detecting the voltage of the fuel cell;

a micro-processor controlling the current generation unit to generate the first current when the voltage of the fuel cell is less than the preset value and controlling the current generation unit to generate the second current when the voltage of the fuel cell exceeds the preset value.

5. The driving device as claimed in claim 4, wherein the energy management module further comprises with a second switch coupled between the fuel cell and the voltage transformation unit and controlled by the micro-processor.

6. The driving device as claimed in claim 5, wherein the energy management module further comprises a temperature detection unit detecting the temperature of the fuel cell.

7. The driving device as claimed in claim 6, wherein the micro-processor turns on the second switch according to the temperature of the fuel cell.

8. An energy management module coupled to a secondary cell and a fuel cell for driving a load, comprising:— a voltage transformation unit transforming a voltage of the secondary cell or a voltage of the fuel cell to generate a voltage signal;

a current generation unit receiving the voltage signal and generating a first current or a second current according to the voltage of the fuel cell, wherein when the voltage generated by the fuel cell is less than a preset value, the energy management module provides the first current to the load, and when the voltage generated by the fuel cell exceed the preset value, the energy management module provides the second current to the load, wherein the second current exceeds the first current;

the current generation unit comprising:— a current limit unit providing a first impedance value or second impedance value according to the voltage of the fuel cell;

the current limit unit comprises:

a first resistor;

a second resistor;

a first switch connected in series with the second resistor, when the first switch is turned off the first resistor is disconnected from the second resistor and the current limit provides the first impedance value;

when the first switch is turned on the first resistor is connected in parallel with the second resistor and the current limit provides the second impedance value; and a controller generating the first current when the current limit unit provides the first impedance value and generating the second current when the current limit provides the second impedance value.

9. The energy management module as claimed in claim 8, wherein the first switch is turned off when the voltage of the fuel cell is less than the preset value and the first switch is turned on when the voltage of the fuel cell exceeds the preset value.

10. The energy management module as claimed in claim 8, further comprising a process unit, wherein the process unit detects the state of the fuel cell and controls the current generation unit to generate the first or the second current according to the detection result.

11. The energy management module as claimed in claim 10, wherein the process unit comprises:

a detection circuit detecting the voltage of the fuel cell;

a micro-processor controlling the current generation unit to generate the first current when the voltage of the fuel cell is less than the preset value and controlling the current generation unit to generate the second current when the voltage of the fuel cell exceeds the preset value.

12. The energy management module as claimed in claim 11, further comprising a second switch, wherein the second switch is coupled between the fuel cell and the voltage transformation unit and controlled by the micro-processor.

13. The energy management module as claimed in claim 12, further comprising a temperature detection unit, wherein the temperature detection unit detects the temperature of the fuel cell.

14. The energy management module as claimed in claim 13, wherein the micro-processor turns on the second switch according to the temperature of the fuel cell.

* * * * *